(12) United States Patent
Oliver et al.

(10) Patent No.: US 12,013,937 B1
(45) Date of Patent: Jun. 18, 2024

(54) DETECTION AND IDENTIFICATION OF MALWARE USING A HIERARCHICAL EVOLUTIONARY TREE

(71) Applicant: Trend Micro Incorporated, Tokyo (JP)

(72) Inventors: Jonathan James Oliver, Melbourne (AU); Chia-Yen Chang, Taipei (TW); Wen-Kwang Tsao, Taipei (TW); Joseph Cepe, Mansfield, TX (US); Maria Estella Manly Reyes, Pasig (PH); Paul Christian D. Pajares, Manila (PH); Jayson Pryde, Manila (PH); Chiaming Chiang, Taipei (TW); Brandon Niemczyk, Hutton, TX (US); Leslie Zsohar, Liberty Hill, TX (US)

(73) Assignee: Trend Micro Incorporated, Tokyo (JP)

( * ) Notice: Subject to any disclaimer, the term of this patent is extended or adjusted under 35 U.S.C. 154(b) by 202 days.

(21) Appl. No.: 17/388,191

(22) Filed: Jul. 29, 2021

Related U.S. Application Data

(63) Continuation of application No. 16/430,758, filed on Jun. 4, 2019, now abandoned.

(51) Int. Cl.
*G06F 21/56* (2013.01)
*G06F 16/901* (2019.01)
(Continued)

(52) U.S. Cl.
CPC ........ *G06F 21/564* (2013.01); *G06F 16/9027* (2019.01); *G06F 16/906* (2019.01);
(Continued)

(58) Field of Classification Search
CPC .... G06F 21/564; G06F 21/565; G06F 21/568; G06F 21/561; G06F 16/906; G06F 16/9027; H04L 9/0643
See application file for complete search history.

(56) References Cited

U.S. PATENT DOCUMENTS 9,361,458 B1 * 6/2016 Feng ...................... G06F 21/564
9,569,617 B1 * 2/2017 Chen ....................... G06F 21/56
(Continued)

OTHER PUBLICATIONS

Pitolli, Gregorio; Aniello, Leonardo; Laurenza, Giuseppe; Querzoni, Leonardo; Baldoni, Roberto; "Malware family identification with BIRCH clustering," 2017 International Carnahan Conference on Security Technology (ICCST), Madrid, Spain, 2017, pp. 1-6.*
(Continued)

*Primary Examiner* — Victor Lesniewski
(74) *Attorney, Agent, or Firm* — Beyer Law Group LLP

(57) ABSTRACT

A computer system generates a hierarchical evolutionary tree of digests of sample files. The digests are generated using a locality sensitive hashing function. The digests are grouped into several clusters, and the clusters are grouped into several nodes. The nodes are connected in hierarchical order to generate the hierarchical evolutionary tree. A digest of a file being evaluated for malware is generated using the locality sensitive hashing function. The digest is put in a cluster of the hierarchical evolutionary tree having digests that are most similar to the digest relative to digests of other clusters of the hierarchical evolutionary tree. The digest is identified to be of the same malware family as the digests of the cluster.

15 Claims, 11 Drawing Sheets

(51) Int. Cl.
  *G06F 16/906* (2019.01)
  *H04L 9/06* (2006.01)
(52) U.S. Cl.
  CPC .......... *G06F 21/561* (2013.01); *G06F 21/565* (2013.01); *G06F 21/568* (2013.01); *H04L 9/0643* (2013.01)

(56) References Cited

U.S. PATENT DOCUMENTS

| | | | | |
|---|---|---|---|---|
| 10,230,749 | B1* | 3/2019 | Rostami-Hesarsorkh | G06N 5/003 |
| 10,432,648 | B1* | 10/2019 | Xu | H04L 63/1416 |
| 10,491,627 | B1* | 11/2019 | Su | H04L 63/145 |
| 11,068,595 | B1* | 7/2021 | Chiang | G06F 21/565 |
| 11,182,481 | B1* | 11/2021 | Oliver | G06N 20/00 |
| 11,663,161 | B2* | 5/2023 | Tian | G06F 16/152 707/747 |
| 11,687,652 | B1* | 6/2023 | Pinheiro | G06F 21/564 726/23 |
| 11,886,586 | B1* | 1/2024 | Chang | G06F 21/568 |
| 2011/0271341 | A1* | 11/2011 | Satish | G06F 21/566 726/23 |
| 2014/0165198 | A1* | 6/2014 | Altman | G06F 21/561 726/23 |
| 2014/0201208 | A1* | 7/2014 | Satish | G06F 21/564 707/737 |
| 2015/0096023 | A1* | 4/2015 | Mesdaq | G06F 21/566 726/23 |
| 2016/0212153 | A1* | 7/2016 | Livshits | G06F 21/563 |
| 2017/0091451 | A1* | 3/2017 | Kovác | G06F 21/562 |
| 2019/0005242 | A1* | 1/2019 | Agarwal | G06F 21/566 |
| 2019/0199736 | A1* | 6/2019 | Howard | G06N 20/00 |
| 2019/0213446 | A1* | 7/2019 | Tsou | G06K 9/6282 |
| 2019/0332769 | A1* | 10/2019 | Fralick | G06F 21/554 |
| 2020/0004956 | A1* | 1/2020 | Romanenko | G06N 20/20 |
| 2020/0314117 | A1* | 10/2020 | Nguyen | H04W 12/12 |
| 2021/0240829 | A1* | 8/2021 | Srinivasagopalan | G06F 18/23 |
| 2021/0304013 | A1* | 9/2021 | Zhang | G06N 5/01 |
| 2021/0342447 | A1* | 11/2021 | Sanzgiri | H04L 63/1441 |

OTHER PUBLICATIONS

Umm-e-Hani; Ali; Ismail; Khan; Durad; "Identification of Malware Families for Creating Generic Signatures: Using Dynamic Analysis and Clustering Methods," 2020 International Symposium on Recent Advances in Electrical Engineering & Computer Sciences (RAEE & CS), Islamabad, Pakistan, 2020, pp. 1-6.*

Chakraborty, Tanmoy; Pierazzi, Fabio; Subrahmanian, V.S.; "EC2: Ensemble Clustering and Classification for Predicting Android Malware Families," IEEE Transactions on Dependable and Secure Computing, vol. 17, No. 2, 2020, pp. 262-277.*

* cited by examiner

```
(402
 height_55   nchild=6    MW_Bladabindi
 0003C6CA63A84A16C77CA37945E72E34142F2E18B2C57D76D0CDC88ED0F37640098B1A1  n=2   r=13
 0003D78B63A44932C2BC77B98122D31103F8E5875D67DB1D4CE948DE0B3B6410D8AD91    n=2   r=11
 A813C68FA3940B32C27CABB94552D71957F1B3870D67C39D0CEC84EA1F3AA44998B1D6    n=29  r=25  20130403
 0013B78AA394BC11C27DB7B980728345O3B2A58B5853F35D4CDC84FD0F363406D4A5A2    n=2   r=13  20160314
 0013C69EA3985D22C3BCDBB84921C35543F1A68B1993D39D0CEEC4E90F3BA424DDB591    n=2   r=1   20170326   Bladabindi
 height_41         MW_Bladabindi                                                                  Bladabindi
403                                                                                               Bladabindi
 0013968AA3987D12C37DB7788432931507F2B5871956EB8D0CCC99FD0F362506D8A1A2    n=2   r=8
 0013B68E63A47D11C27CB3B945368345 43B1B68758 62E79E0CC88DFD0F76314299F6A2  n=38  r=19  20160311   Bladabindi
 0013B68E63A48D11C27CA3B9462593 4543F1F68B9CA2D75E0CC9CDED1B7A7040E9F6A2   n=3   r=20  20160324   Bladabindi
 0013848A73A87D12C67DB3748831834593F2A5871D62EB5D0CD8D8FA0F362403E8A562   n=2   r=7   20170115
 0013A59AA3987D21C27C67B54931D30943F2B68B18A3E78D0CC985FD0F377013D8A5A2   n=3   r=15  20171105   Bladabindi
```

FIG. 8

```
         ┌501   ┌502
         MW:100%  Bladabindi:80%
193A ─── 3df1be8a730cb32ff7e3754d756a52dba04eca2c   MW  20170515  Bladabindi
193B ─── 33e0fee1283f01b17ee387b310564e0d6e43e88a   MW  20170515  Bladabindi
         9ac086925b5bf5f3465ecc6f68d3cbe0715ee8a6    MW  20170515  Bladabindi
         e4a5c5b870c70d6717dd0200b8c23dc92eeb6233    MW  20170515  Bladabindi
         42888dfe9012cdeae109ca1694607b6de1af4312    MW  20170515  Bladabindi
         5b8aa2af3bb47c8764d2985244117740a0432121b   MW  20170515  Bladabindi
         3da6c20a1f4e2846b5a615e00e82fdf34a924a86    MW  20170515  Bladabindi
         b854ee1bb3e702668218fa75747c313f06663d4b    MW  20170515  Bladabindi
         bffd8706749e77529b6031318fed0584e874d44e    MW  20170515  Bladabindi
         1b8c52f56016b6e6f0d6ed8c50d0fb746c8de448    MW  20170515  Bladabindi
         481c491287775dd083ed1f0aab3e09dc61d020e8    MW  20170515  Bladabindi
         ab71109af44f28e8ca921043c88ba5eddfce8f85    MW  20170515  Bladabindi
193M ─── fba818ff530c3f4facc34ce0f6e17fbee28bdd74   MW  20170519  Bladabindi
193N ─── f19b0701da2a99a258314ea3ea6c4e466418d0e8   MW  20170614  Bladabindi
         98491569196942d0c118f4c0293022a795ff278d   MW
```

DETECTION AND IDENTIFICATION OF MALWARE USING A HIERARCHICAL EVOLUTIONARY TREE

CROSS-REFERENCE TO RELATED APPLICATION

This application is a continuation of U.S. application Ser. No. 16/430,758, filed on Jun. 4, 2019, which is incorporated herein by reference in its entirety.

BACKGROUND OF THE INVENTION

1. Field of the Invention

The present invention relates generally to computer security, and more particularly but not exclusively to methods and systems for combating malware.

2. Description of the Background Art

Malware may be detected using various antivirus techniques, including by looking for its signature. For example, antivirus researchers may collect samples of malware, and analyze the samples to identify patterns indicative of malware. The patterns may be deployed in an endpoint computer to scan files for malware. An ongoing problem with malware detection is that there are multitudes of malware in the wild and malware may mutate to a number of variants, making malware identification complicated and the patterns extremely difficult to keep up-to-date.

SUMMARY

In one embodiment, a computer system generates a hierarchical evolutionary tree of digests of sample files. The digests are generated using a locality sensitive hashing function. The digests are grouped into several clusters, and the clusters are grouped into several nodes. The nodes are connected in hierarchical order to generate the hierarchical evolutionary tree. A digest of a file being evaluated for malware is generated using the locality sensitive hashing function. The digest is put in a cluster of the hierarchical evolutionary tree having digests that are most similar to the digest relative to digests of other clusters of the hierarchical evolutionary tree. The digest is identified to be of the same malware family as the digests of the cluster.

These and other features of the present invention will be readily apparent to persons of ordinary skill in the art upon reading the entirety of this disclosure, which includes the accompanying drawings and claims.

DESCRIPTION OF THE DRAWINGS

FIG. 8 shows a data structure of a hierarchical evolutionary tree in accordance with an embodiment of the present invention.

FIG. 9 shows a data structure of an example cluster in accordance with an embodiment of the present invention.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
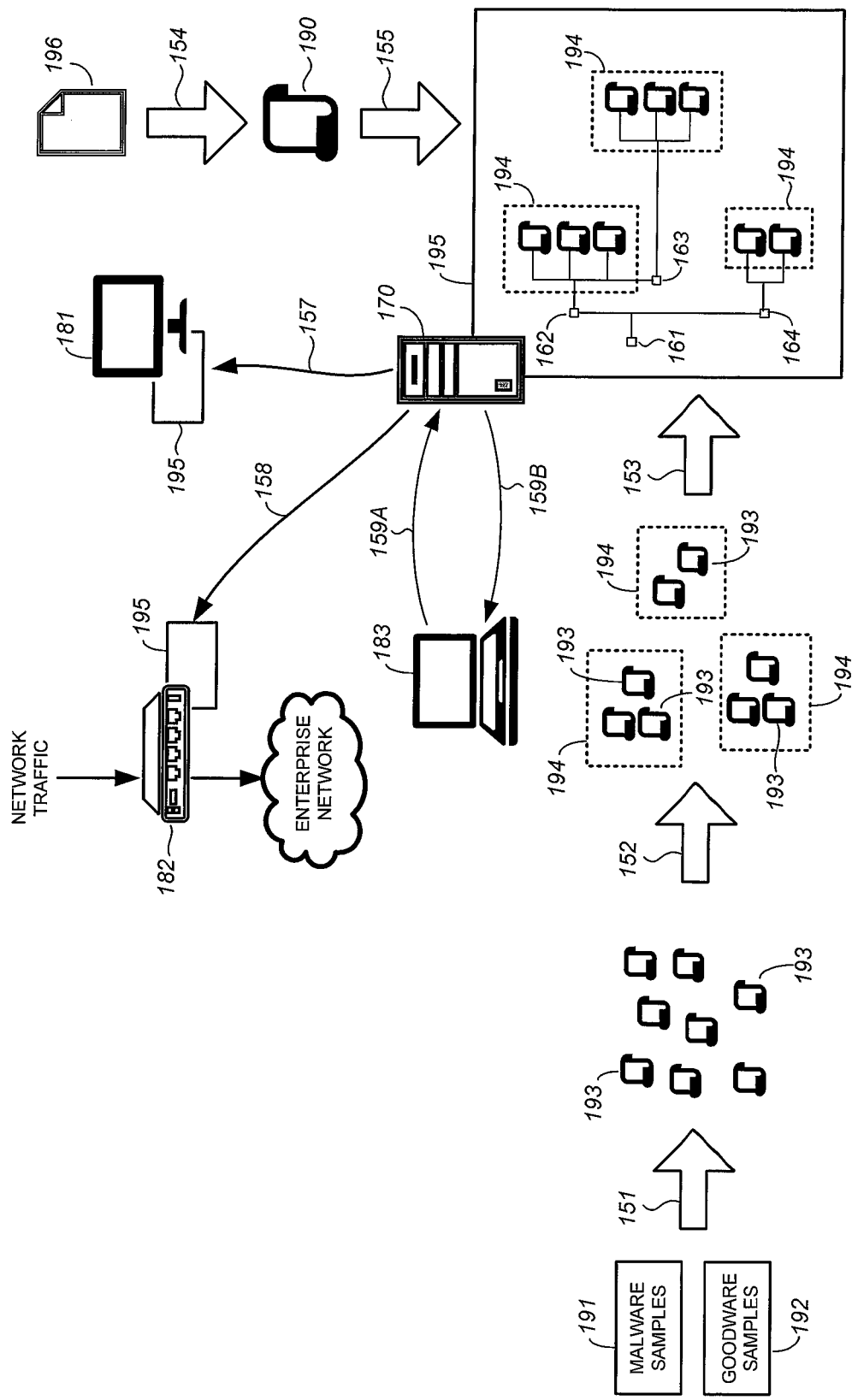
FIG. 1 shows a logical diagram of a system for identifying malware in accordance with an embodiment of the present invention.

FIG. 1 shows a logical diagram of a system for identifying malware in accordance with an embodiment of the present invention. The system of FIG. 1 includes a support server 170, which may comprise a computer and associated software for generating a hierarchical evolutionary tree 195. In one embodiment, the evolutionary tree 195 includes a hierarchical arrangement of clusters of digests of files, and information about the clusters and the digests. The system of FIG. 1 may further comprise additional computers, such as an endpoint computer 181, gateway 182, and an end user computer 183, where files may be inspected for malware using information from the evolutionary tree 195.

In the example of FIG. 1, the support server 170 includes malware samples 191 and goodware samples 192. For purposes of the present disclosure, a "malware" is a file with malicious code, and "goodware" is a file that is known to be good. The malware samples 191 may comprise known malware collected from honeypots, submitted by end users, received from computer security vendors, etc. The goodware samples 192 may comprise executables signed by reputable software vendors, files that have been verified to be free of malware, etc.

The support server 170 may generate a mathematical representation of a sample file, for example by using a hashing algorithm to generate a digest of the sample file. In one embodiment, the support server 170 employs a locality sensitive hashing algorithm, such as the Trend Micro Locality Sensitive Hash (TLSH), to convert each sample file of the malware samples 191 and goodware samples 192 to a digest 193 (see arrow 151). Generally speaking, a locality sensitive hashing algorithm may extract many very small features (e.g., 3 bytes) of a file and put the features into a histogram, which is encoded to generate the digest. The mathematical distance between digests of two files may be scored to measure the similarity of the two files. As can be appreciated, a digest has no semantic information of the corresponding file; the digest is simply a value computed from the binary of the file. Other suitable mathematical distance or approximate distance function between files may also be used.

The support server 170 may employ a hierarchical clustering algorithm to group the digests 193 into a plurality of clusters 194 (see arrow 152) and arrange the clusters 194 into the evolutionary tree 195 (see arrow 153). The clusters 194 may be grouped into a plurality of nodes 161, 162, 163, 164, etc., which may be connected in hierarchical order to form the evolutionary tree 195. In the example of FIG. 1, the node 161 is the root node, the node 162 is a non-leaf node, and the nodes 163 and 164 are leaf nodes. As can be appreciated, the evolutionary tree 195 may have additional or fewer nodes.

In one embodiment, the support server 170 is configured to group the digests 193 based on the mathematical distance ("distance") between the digests. The distance between two digests is a measure of how similar the two digests are. The distance between two digests may be computed using an approximate Hamming distance algorithm, for example. Generally speaking, the Hamming distance between two digests of equal length is a measure of the differences between positions of the digests. The lower the Hamming the distance, the more similar the digests.

Figure 2:
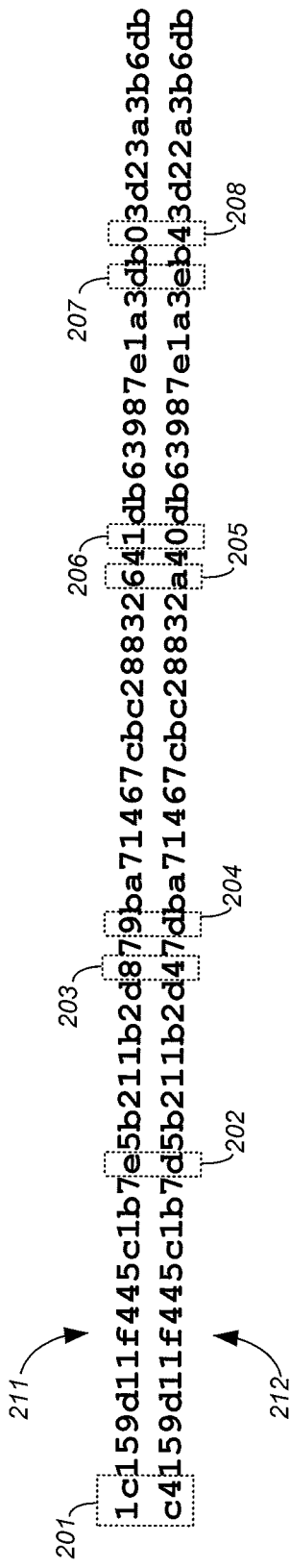
FIG. 2 shows example digests that may be processed in accordance with an embodiment of the present invention.

FIG. 2 shows a digest 211 of a first version of the Google Chrome™ web browser executable file (i.e., "chrome.exe") and a digest 212 of a second version of the same executable file (i.e., another version of "chrome.exe"). The digests 211 and 212 were computed using the Trend Micro Locality Sensitive Hash (TLSH) function. Open source program code of the TLSH function is available on the Internet.

In the example of FIG. 2, dashed boxes 201-208 indicate hexadecimal positions where the digests 211 and 212 are different. For example, referring to the dashed box 203, the distance between 0×8 (binary 1000) and 0×4 (binary 1000) is 2 using a Hamming distance algorithm, i.e., Ham(8,4)=2. Similarly, referring to the dashed box 205, the distance between 0×6 (binary 0110) and Oxa (binary 1010) is 2 using a Hamming distance algorithm, i.e., Ham(6,a)=2. The distances between individual positions of the digests 211 and 212 may be summed to give an overall distance between the digest 211 and the digest 212.

Referring back to FIG. 1, the support server 170 may receive and add an unlabeled file 196 to the evolutionary tree 195. The file 196 is "unlabeled" in that it is now known whether the file 196 is goodware or malware. The support server 170 may be configured to generate the digest 190 of the file 196 (see arrow 154) and find, from the evolutionary tree 195, a cluster 194 having digests 193 that are most similar to the digest 190 relative to digests of other clusters in the evolutionary tree 195. More particularly, in the evolutionary tree 195, the digest 190 is included in a cluster 194 having corresponding digests 193 that are within a predetermined distance to the digest 190. This allows the digest 190 to be grouped with similar digests 193.

In a cluster 194 having digests 193 of the same label, i.e., all goodware or all malware, the digest 190 may be assigned the same label as the digests 193 of the cluster 194. The digest 190 may also be deemed to have the same lineage as the digests 193 of the cluster 194. For example, the digest 190 may be identified as a variant of the same family as the digests 193 of the cluster 194. In the case where the digests 193 of the cluster 194 are all malware, knowing that the digest 190 is a variant of particular malware family advantageously allows selection of the most appropriate response action against the file 196 of the digest 190. As a particular example, knowing that the digest 190 is a variant of digests 193 of a particular botnet, a computer network may start looking for presence of communications to or from the particular botnet. In the case where the digests 193 of the cluster 194 are all goodware, the file 196 of the digest 190 may be whitelisted as goodware when, for example, the file 196 is signed by a reputable signer.

In a cluster 194 with digests of mixed labels, i.e., some malware and some goodware, additional processing may be performed to verify the label of the digest 190. For example, if the digest 190 is in the same cluster 194 as digests 193 of goodware, but the file 196 of the digest 190 is not signed by a reputable vendor of the files of the digests 193, the digest 190 may be deemed to be malware. As a particular example, if the file 196 has a digest 190 that is similar to a digest of a known good executable file of the Microsoft™ operating system (e.g., in the same cluster 194 in the evolutionary tree 195) but the file 196 is not signed by the Microsoft™ Corporation, the digest 190 may be deemed to be malware.

As can be appreciated from the foregoing, the evolutionary tree 195 may be employed for malware detection and identification and for whitelisting, among other applications. In the example of FIG. 1, the endpoint computer 181 may receive the evolutionary tree 195 from the support server computer 170 (see arrow 157). The endpoint computer 181 may receive a target file, i.e., file being evaluated, generate a digest of the target file, and place the digest in the evolutionary tree 195 to determine if the target file is malware or goodware and, if the target file is malware, determine the identity of the malware (e.g., identify the target file as belonging to a particular malware family).

The evolutionary tree 195 may also be provided as a service to other computers. In the example of FIG. 1, the end user computer 183 may provide a target file to the support server 170 (see arrow 159A). The support server 170 may generate a digest of the target file, place the digest in the evolutionary tree 195 to determine if the target file malware or goodware and, if the target file is malware, determine the identity of the malware. The support server 170 may provide the result of evaluating the target file to the end user computer 183 (see arrow 159B). For example, as part of a response action against a target file that has been identified to be of a particular malware family, the end user computer 183 may be alerted that the target file is malware of the particular malware family.

The evolutionary tree 195 may also be provided to a central computer that screens network traffic. In the example of FIG. 1, the gateway 182 provides a centralized scanning service for an enterprise network. The gateway 182 may receive the evolutionary tree 195 from the support server 170 (see arrow 158). The gateway 182 may receive network traffic, extract a target file from the network traffic (e.g., at layer 7), generate a digest of the target file, and place the digest in the evolutionary tree 195 to determine if the target file is malware or goodware and, if the target file is malware, determine the identity of the malware. The gateway 182 may block network traffic carrying the malware.

As can be appreciated, various response actions may be performed in response to detecting that a file is malware. For example, the file may be put in quarantine, deleted, blocked, or otherwise prevented from being executed. The response action may also include alerting an end user computer that requested evaluation of the target file for malware.

Figure 3:
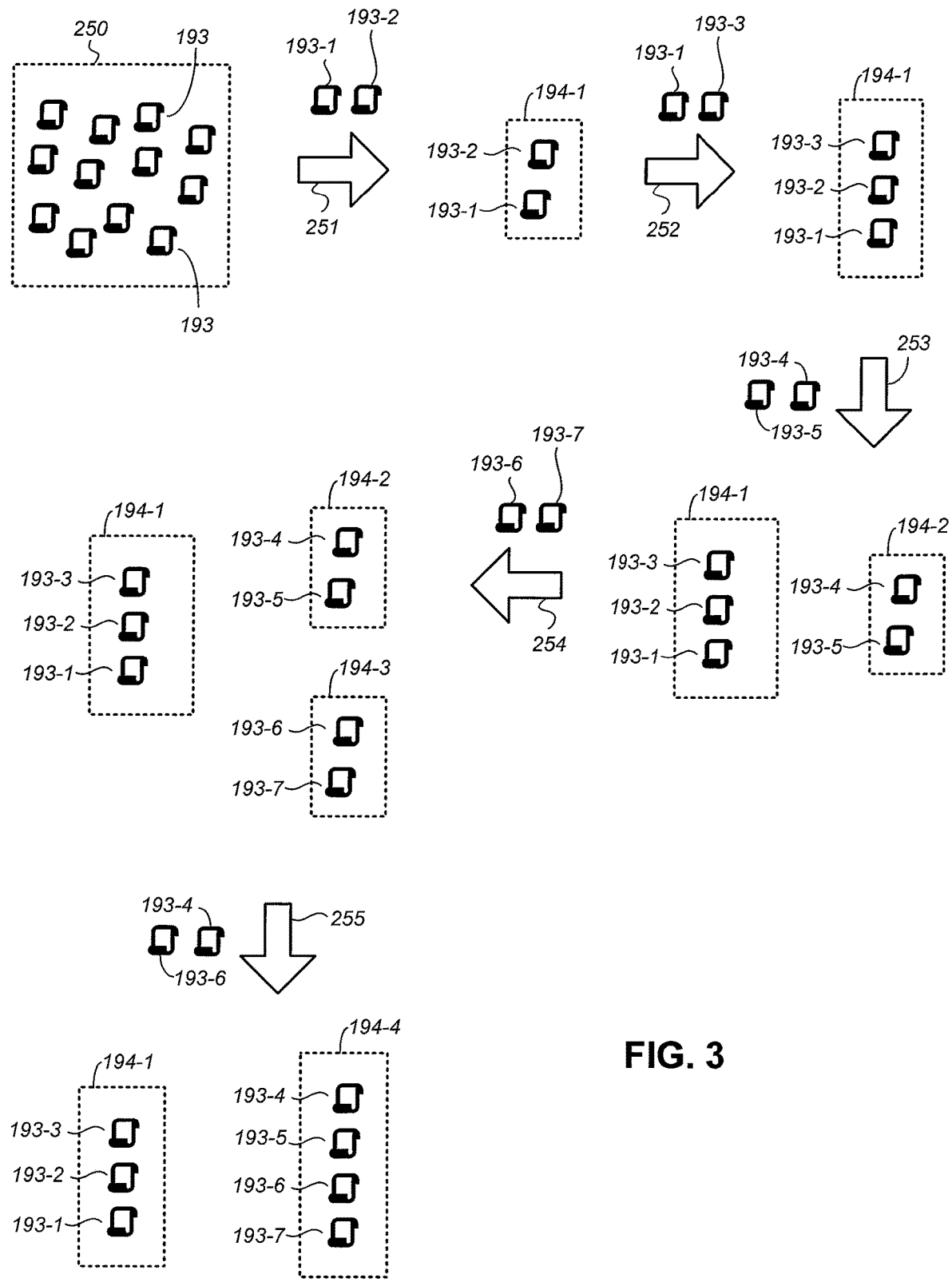
FIG. 3 shows a graphical illustration of a method of grouping digests into a plurality of clusters in accordance with an embodiment of the present invention.

FIG. 3 shows a flow diagram that graphically illustrates a method of grouping digests into a plurality of clusters in accordance with an embodiment of the present invention. The method of FIG. 3 may be performed by the support server 170.

In the example of FIG. 3, a data pool 250 comprises a plurality of digests 193 of samples of malware, goodware, or a combination of malware and goodware. From the data pool 250, the two closest digests (i.e., the most similar in terms of distance) that are not in the same cluster are selected. The two selected digests are put in the same cluster. In the example of FIG. 3, there is no cluster in the beginning of the clustering process. Accordingly, selecting a digest 193-1 and a digest 193-2 from the data pool 250 results in the digest 193-1 and the digest 193-2 being put in the same cluster 194-1 in the beginning of the clustering process (see arrow 251).

The clustering process continues until the distance between the two closest digests that are not in the same cluster is greater than a predetermined threshold distance T. In the example of FIG. 3, the digests 193-1 and 193-3 are not in the same cluster and are the closest digests in the data pool 250 (see arrow 252). Because the digest 193-1 is already included in the cluster 194-1, the digest 193-3 is not included in any cluster, and the clustering process puts the two selected digests in the same cluster, the digest 193-3 is included in the cluster 194-1, where the digest 193-1 is already a member. This results in the current digest 194-1 having the digests 193-1, 193-2, and 193-3 as members (see arrow 252). The same procedure is performed when the digest 193-3 is already in a cluster, but the digest 193-1 is not yet included in any cluster. In that case, the digest 193-1 will be included in the cluster that already includes the digest 193-3.

Continuing the example of FIG. 3, the digests 193-4 and 193-5, which are the closest digests in the data pool 250 that are not in the same cluster, are next selected (see arrow 253). Because, the clustering process combines the two selected digests in the same cluster, and the digests 193-4 and 193-5 are not included in any cluster, the digests 193-4 and 193-5 are included in a new cluster 194-2 (see arrow 253).

The example of FIG. 3 continues with the selection of the digests 193-6 and 193-7 (see arrow 254) as the closest digests in the data pool 250 that are not in the same cluster. The digests 193-6 and 193-7 are not included in any cluster, so the digests 193-6 and 193-7 are put in a new cluster 194-3 (see arrow 254). At this point, the digests 193 of the data pool 250 have been grouped into clusters 194-1, 194-2, and 194-3.

The example of FIG. 3 continues with the selection of the digests 193-4 and 193-6 (see arrow 255), which are the closest digests in the data pool 250 that are not in the same cluster. The digest 193-4 is already included in the cluster 194-2 and the digest 193-6 is already included in the cluster 194-3. To include the digests 193-4 and 193-6 in the same cluster, the clustering process merges the clusters 194-2 and 194-3 together, resulting in a new cluster 194-4 that includes the digests 193-4, 193-5, 193-6, and 193-7. At this point, the digests 193 of the data pool 250 have been grouped into clusters 194-1 and 194-4.

Figure 4:
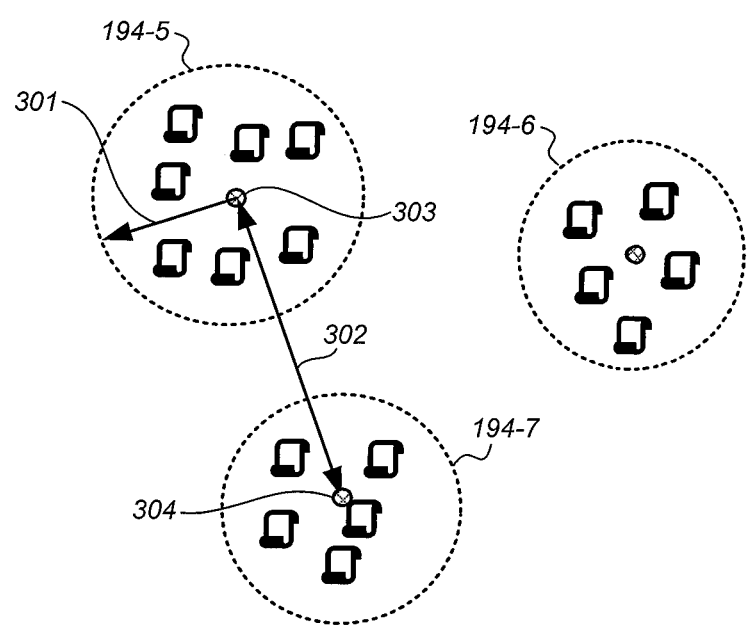
FIG. 4 shows a graphical illustration of features of clusters in accordance with an embodiment of the present invention.

The clustering process ends when the distance between the two closest digests that are not in the same cluster is greater than the threshold distance T. At that point, the digests 193 of the data pool 250 have been grouped into a plurality of clusters 194, with each cluster 194 comprising digests 193 that are very similar to each other. In one embodiment, a cluster is described in terms of a radius of the cluster, and the distance between a center of the cluster and a center of another cluster. This is illustrated in FIG. 4, which shows clusters 194-5, 194-6, and 194-7. In the example of FIG. 4, the distance between the cluster 194-5 and the cluster 194-7 (see distance 302) is the distance between the center 303 of the cluster 194-5 and the center 304 of the cluster 194-7. A center of a cluster may be a digest (also referred to herein as a "center digest") that is calculated from the digests of the cluster. Of course, the center digest may be the digest of an actual file if such a file is present in the cluster. A cluster may have a circular perimeter with a radius that starts from the center digest (e.g., see radius 301 of the cluster 194-5).

The radius of a cluster may be calculated based on the digests included in the cluster. For example, the distance from each member of the cluster to the center of the cluster may be calculated, and the radius may be set to be the maximum of the calculated distances. That is, in one embodiment, the radius is the longest distance from the center of the cluster to a digest of the cluster.

Generally speaking, the center of cluster is the middle of the cluster, and may also be described as an average or median of the members of the cluster. The radius is the "spread" or variability of the members of the cluster, and may also be described in terms of standard deviation, variance, average distance from the center, etc.

Figure 5:
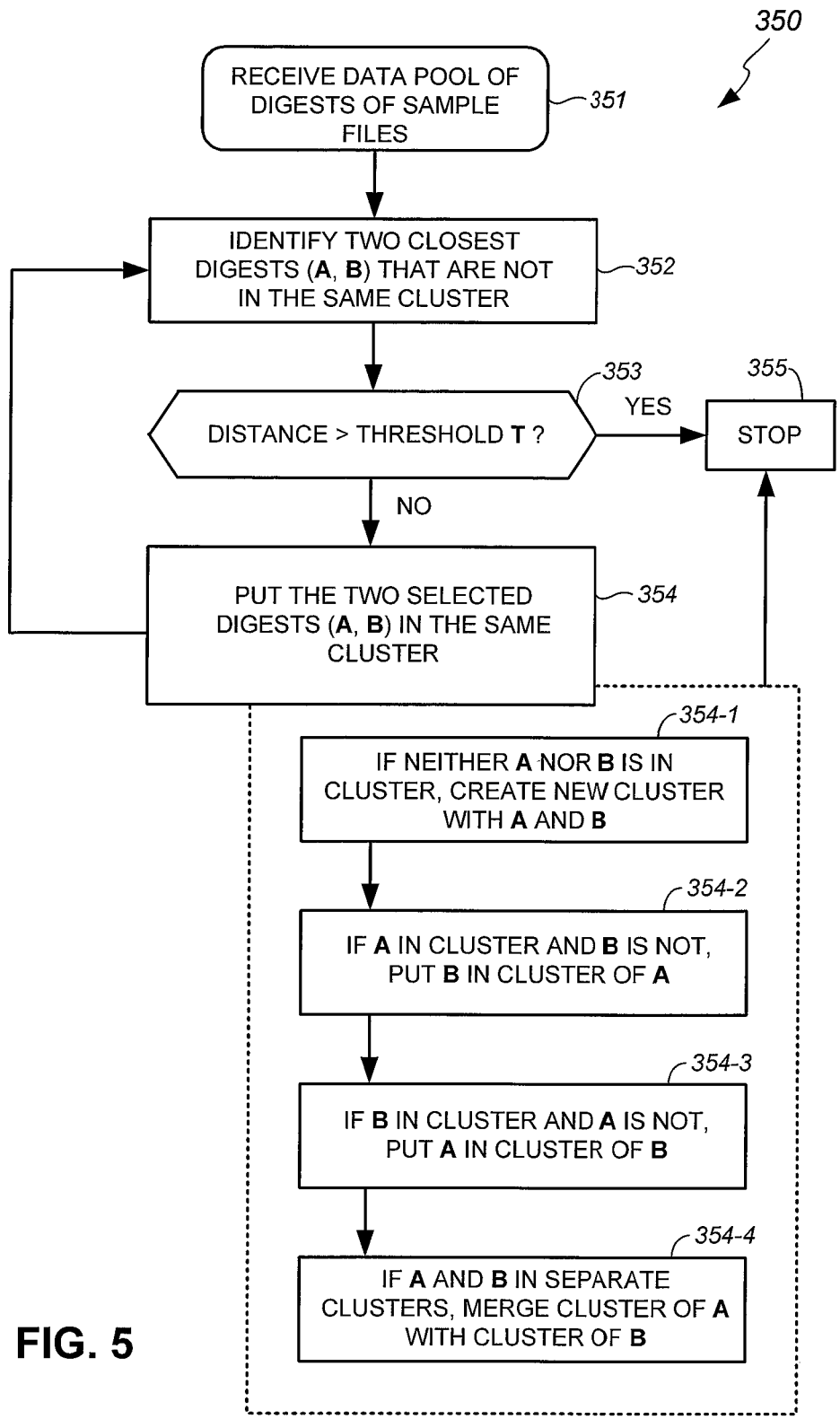
FIG. 5 shows a flow diagram of a method of grouping digests into a plurality of clusters in accordance with an embodiment of the present invention.

FIG. 5 shows a flow diagram of a method 350 of grouping digests into a plurality of clusters in accordance with an embodiment of the present invention. In the example of FIG. 5, the method 350 begins with a data pool comprising digests of sample files (step 351). The sample files may be samples of malware, goodware, or a combination of malware and goodware. The digests may be generated by applying a locality hash function on the sample files. For example, a digest of a sample file may be generated by applying a TLSH function on the sample file.

From the data pool, two closest digests that are not in the same cluster are selected (step 352). For optimization of distance calculations, the digests may be indexed in a random decision forest, as in, for example, commonly-assigned U.S. Pat. No. 10,162,967, which is incorporated herein by reference in its entirety. Other suitable algorithms (e.g., metric trees) for optimizing distance calculations may also be employed without detracting from the merits of the present invention.

When the distance between the two selected digests is greater than the threshold T, the clustering process is stopped (step 353 to step 355). A distance greater than the threshold T indicates that all of the similar digests from the data pool have already been put in clusters. The threshold T may be selected based on the particulars of the application, such as the sample files and the algorithm employed to calculate the digests, and verified by experimentation.

When the distance between the two selected digests is less than the threshold T, the method 350 puts the two selected digests in the same cluster (step 354). There are several possibilities.

First, if neither of the two selected digests is in a cluster, the two selected digests are put in a newly-created cluster (step 354-1).

Second, if one of the two selected digests is in a cluster but the other is not, the digest that is not a member of a cluster is included in the cluster of the other digest. More particularly, given two selected digests A and B, if digest A is in a cluster but digest B is not, digest B is put in the cluster of digest A (step 354-2). Similarly, if digest B is in a cluster but digest A is not, digest A is put in the cluster of digest B (step 354-3).

Third, if both digests A and B are already in separate clusters, the cluster of digest A is merged with the cluster of digest B to create a new cluster (step 354-4). The method 350 continues (step 354 to step 352) until the distance between the two closest digests that are not in the same cluster is greater than the threshold T. At the end of the clustering process, the digests from the data pool are grouped into a plurality of clusters, with each cluster comprising similar but different digests, and the digests of a cluster being a subset of the digests of the data pool.

Figure 6:
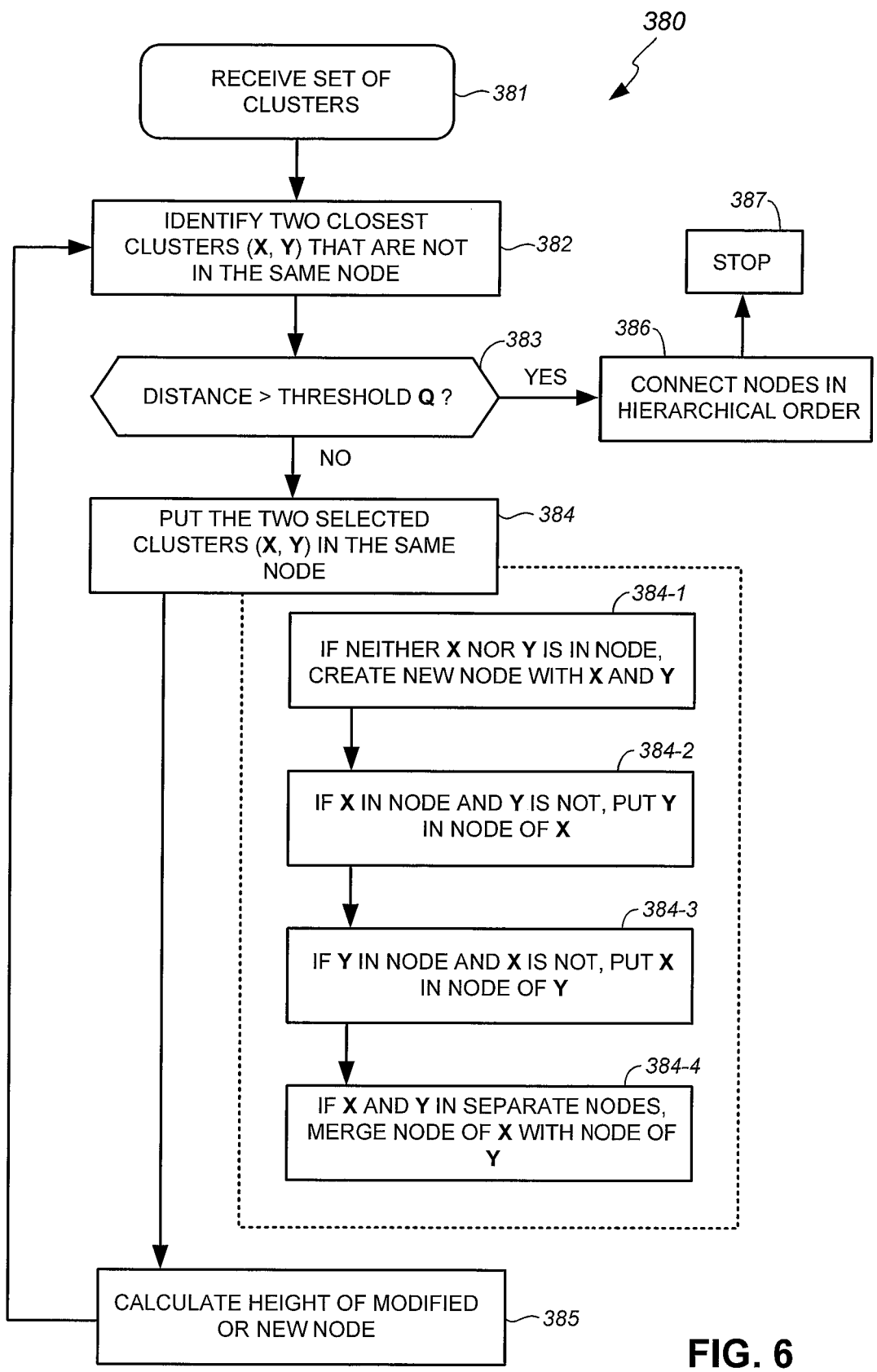
FIG. 6 shows a flow diagram of a method of generating a hierarchical evolutionary tree in accordance with an embodiment of the present invention.

FIG. 6 shows a flow diagram of a method 380 of generating a hierarchical evolutionary tree in accordance with an embodiment of the present invention. In the example of FIG. 6, the method 380 receives a set of clusters, with each cluster comprising digests of files (step 381). The clusters may have been formed in accordance with the method 350 of FIG. 5. From the set of clusters, two closest clusters that are not in the same node are selected (step 382). In one embodiment, the distance between two clusters is measured from a center of one cluster to a center of the other cluster (e.g., see FIG. 4, 302). For optimization of cluster distance calculations, the centers of the clusters may be indexed in a random decision forest.

When the distance between the two selected clusters is greater than a predetermined threshold Q, the tree generation process is stopped (step 383, to step 386, to step 387). A distance greater than the threshold Q indicates that all of the similar clusters from the set of clusters have already been put in nodes. The threshold Q may be selected based on the particulars of the application, such as the sample files and the algorithm employed to calculate the digests, and verified by experimentation.

When the distance between the two selected clusters is less than the threshold Q, the method 380 puts the two selected clusters in the same node (step 384). There are several possibilities.

First, if neither of the two selected clusters is in a node, the two selected clusters are put in a newly-created node (step 384-1). That is, a new node having the two selected clusters as members is created when neither of the two selected clusters is already a member of a node.

Second, if one of the two selected clusters is a member of a node but the other is not, the cluster that is not a member of a node is included in the node of the other cluster. More particularly, given two selected clusters X and Y, if cluster X is in a node but cluster Y is not, cluster Y is put in the node of cluster X (step 384-2). Similarly, if cluster Y is in a node but cluster X is not, cluster X is put in the node of cluster Y (step 384-3).

Third, if both clusters X and Y are already in separate nodes, the node of cluster X is merged with the node of cluster Y to create a new node (step 384-4).

As can be appreciated, the node creation process of steps 382-384 is similar to the clustering process of the method 350 of FIG. 5. The clustering process groups digests into clusters, whereas the node creation process groups the clusters into nodes of the evolutionary tree.

After the two selected clusters are put in the same node, the height of that node is calculated (step 385). In one embodiment, the height of a node is the average distance between clusters of the node. In the case of a selected cluster being added in a pre-existing node, the height of the pre-existing node is recalculated upon addition of the cluster. In the case of a new node being created for the two selected clusters, the distance between the two selected clusters is the height of the new node.

The method 380 continues (step 385 to step 382) until the distance between the two selected clusters is greater than the threshold Q (step 383 to step 386). At that point, a dendrogram of the evolutionary tree is formed by connecting the nodes in hierarchical order (step 386), which in this example is in terms of height. The evolutionary tree generation process is completed after the nodes are connected (step 387).

Figure 7:
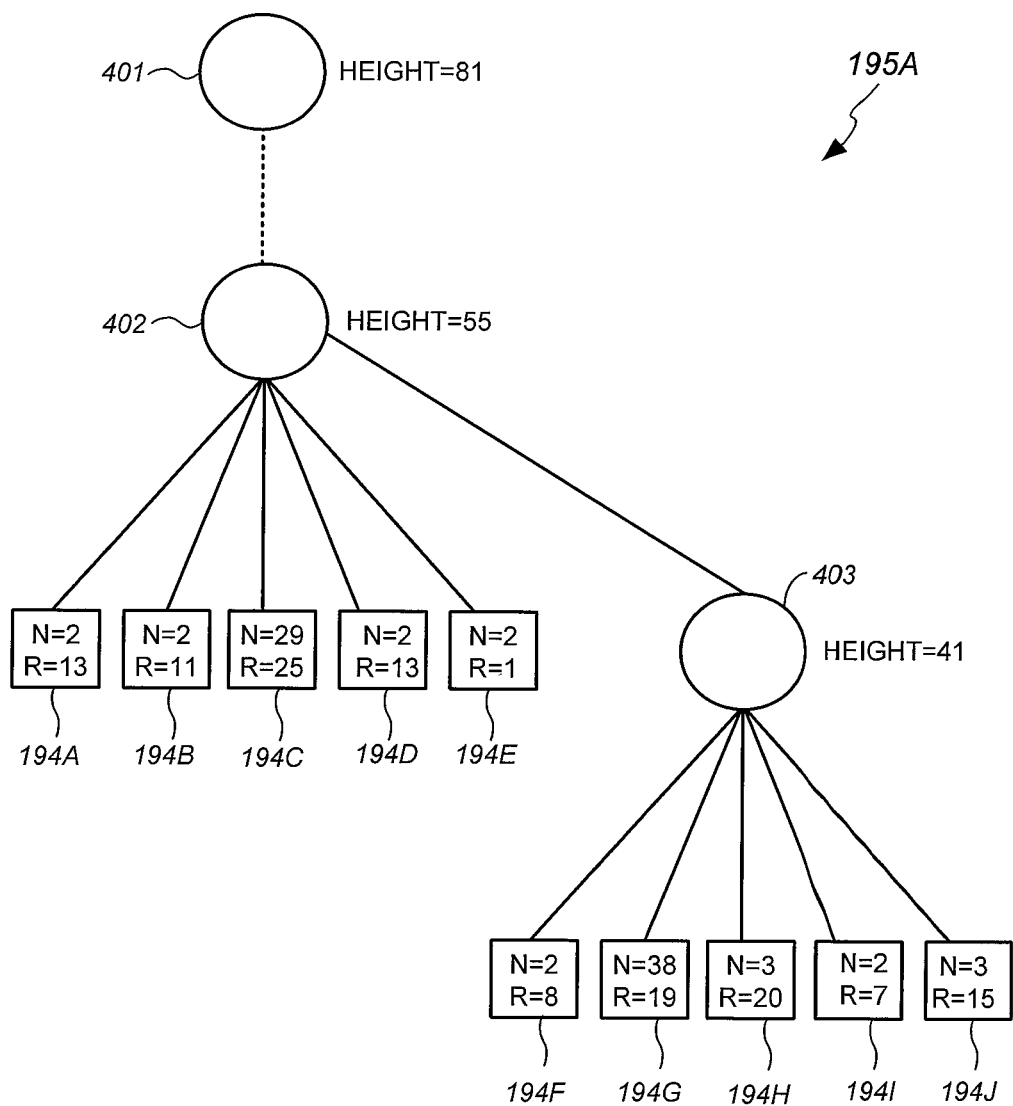
FIG. 7 shows a dendrogram of a hierarchical evolutionary tree in accordance with an embodiment of the present invention.

FIG. 7 shows a dendrogram of a hierarchical evolutionary tree in accordance with an embodiment of the present invention. In the example of FIG. 7, a hierarchical evolutionary tree 195A has nodes 401, 402, 403, etc. The nodes are connected in hierarchical order in terms of height, with nodes that have higher heights being at the upper portion of the evolutionary tree, and nodes that have lower heights being at the lower portion of the evolutionary tree. For example, the node 403 (height=41) is not directly connected directly to the node 401 (height=81), because the node 402 (height=55) is higher than the node 403. Instead, the node 403 is directly connected to the node 402, which in turn is directly connected to the node 401.

In the example of FIG. 7, the node 402 has a height of 55 and consists of clusters 194A, 194B, 194C, 194D, and 194E. In the example of FIG. 7, R indicates the radius of the cluster and N indicates the number of digests in the cluster. For example, the cluster 194A has a radius of 13 (R=13) and consists of 2 digests (N=2). Similarly, the node 403 has a height of 41 and consists of clusters 194F, 194G, 194H, 194I, and 194J. The node 401 may have its own clusters (not shown).

FIG. 8 shows a data structure of a hierarchical evolutionary tree in accordance with an embodiment of the present invention. The example of FIG. 8 is a data structure of the nodes 402 and 403 of the evolutionary tree 195A of FIG. 7. Other nodes of the evolutionary tree 195A are not shown for clarity of illustration.

In the example of FIG. 8, "height" is the average distance between children of the node and "nchild" is the number of children of the node. A node may have a corresponding label, such as "MW_Bladabindi." In one embodiment, the "MW_" in front of the label indicates malware and the "Bladabindi" is the name assigned to the malware family. The children of the node consists of the clusters included in the node and other nodes, if any. As a particular example, the node 402 has a height of 55, has 6 children (i.e., 5 clusters plus the node 403), and has clusters having digests of variants of the so-called Bladabindi malware family.

In the example of FIG. 8, each cluster indicates the digest of the center of the cluster, the number of digests ("n") in the cluster, a radius ("r") of the cluster, the date the malware family was first detected, and the label of the cluster. As a particular example, the cluster 194J of the node 403 indicates the digest of the center of the cluster 194J, followed by the number of digests in the cluster 194J (n=3), the radius of the cluster 194J (r=15), the date the malware family was first detected (20171105; i.e., Nov. 5, 2017), and the name of the malware family ("Bladabindi").

It is to be noted that some of the clusters of the evolutionary tree 195A have missing information. For example, the cluster 194A has no label. However, given that the cluster 194A is similar to other clusters in the node 402 that have been labeled as variants of the malware family Bladabindi, the cluster 194A may also be deemed to be part of the malware family Bladabindi. The threshold on when a cluster assumes the label of the node it belongs in may be adjusted based on false positive/negative requirements.

FIG. 9 shows a data structure of an example cluster in accordance with an embodiment of the present invention. In the example of FIG. 9, a cluster 194Q includes digests 193A, 193B, etc. of sample files. Each digest is followed by a label (e.g., MW for malware), date the sample file was first detected, and the name of the malware family. For example, the row for digest 193A indicates that it is malware, was first detected on May 15, 2017 ("20170515"), and is part of the Bladabindi malware family. The cluster may also indicate the overall label of the cluster and the confidence level of the prediction (see 501), and the name of the malware family of the digests in the cluster and the confidence level of the prediction (see 502). In the example of FIG. 9, the cluster 194Q is malware at a confidence level of 100% and the digests in the cluster 194Q are variants of the Bladabindi malware family at a confidence level of 80%.

It is to be noted that some digests may have missing information. In that case, the digest may assume the label and other information of the other digests in the cluster. For example, the digests 193A and 193B may be originally from the sample malware files, and are known to be of the Bladabindi malware family. The digest 193M has been detected to be malware (e.g., by some other means), but of unknown malware family. Because the digest 193M has been put in the same cluster as other digests of the Bladabindi malware family, the digest 193M may also be labeled as malware of the Bladabindi malware family. This is significant because identifying the malware family of a malware facilitates selection of an antidote to the malware and a most appropriate response action against the malware. As another example, the digest 193N has no label. Because the digest 193N has been put in the same cluster as other digests of the Bladabindi malware family, the digest 193N is detected to be malware and identified as of the Bladabindi malware family. Advantageously, embodiments of the present invention not only allows for detection of malware, but also identification of the malware.

As can be appreciated, the above examples regarding digests, clusters, and nodes, of malware are equally applicable to digests, clusters, and nodes of goodware. That is, a digest of a sample goodware file will be put in a cluster of similar digests, which are most likely variants of the digest, i.e., goodware of the same family as the digest. To prevent infected goodware from being whitelisted, additional verification steps may be employed, for example by verifying that the sample goodware file is signed by a reputable signer.

Figure 10:
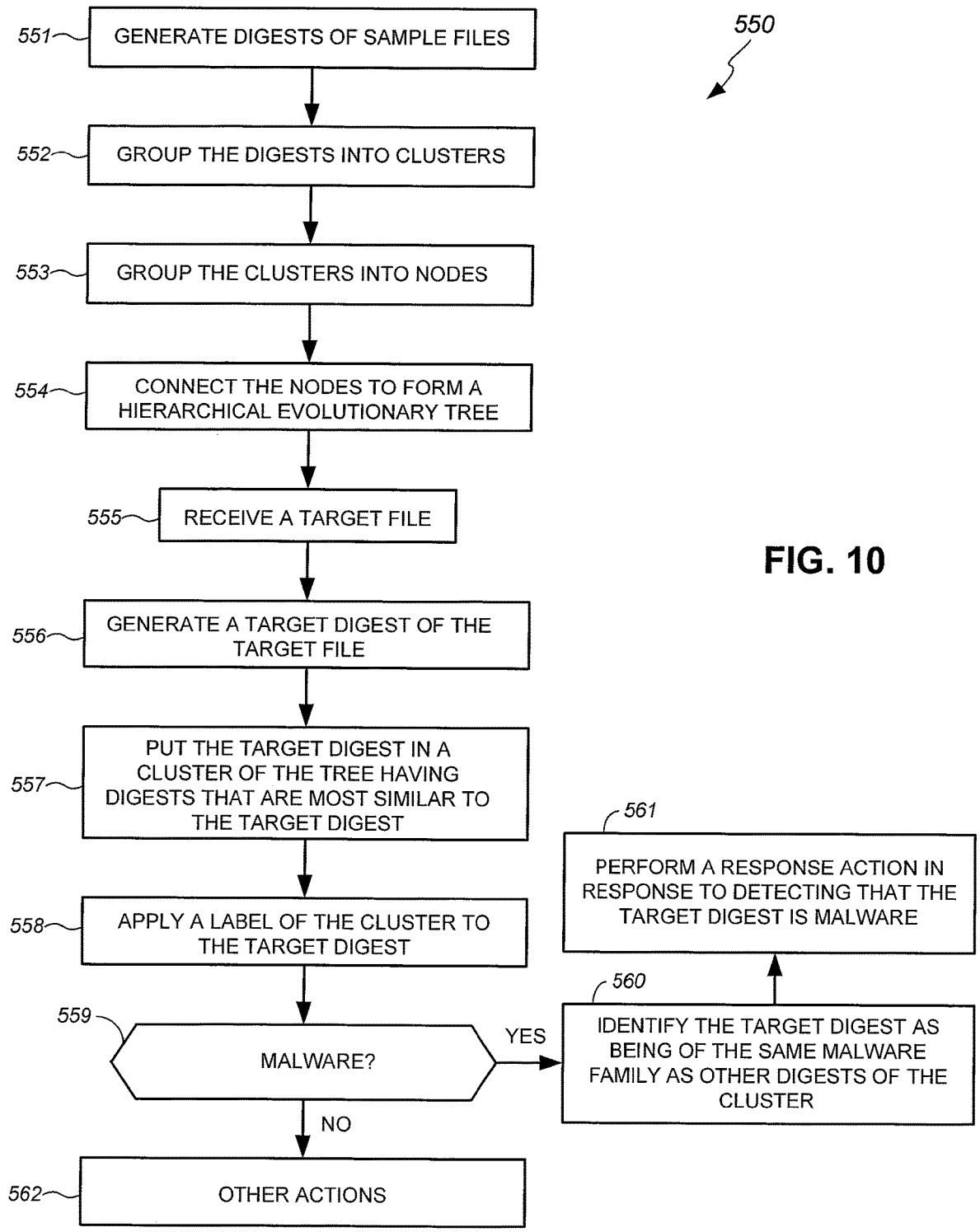
FIG. 10 shows a flow diagram of a method of detecting and identifying malware in accordance with an embodiment of the present invention.

FIG. 10 shows a flow diagram of a method 550 of detecting and identifying malware in accordance with an embodiment of the present invention. The method 550 may be performed by the support server 170 of FIG. 1, or the support server 170 in conjunction with the endpoint computer 181, the gateway 182, the end user computer 183, or other computer.

In the example of FIG. 10, digests of sample files are generated using a locality sensitive hashing function (step 551). The sample files may comprise samples of malware, goodware, or a combination of malware and goodware. The digests are grouped into a plurality of clusters (step 552), with each cluster comprising digests that are different, but similar to one another. The similarity of digests may be in terms of the distance between them. The clusters are thereafter grouped into a plurality of nodes (step 553), with each node comprising clusters having center digests that are different, but similar to one another. A hierarchical evolutionary tree is generated by connecting the nodes in hierarchical order (step 554), for example in terms of height.

The evolutionary tree may be employed to detect and identify malware. When a target file is received in a computer that evaluates files for malware (step 555), a target digest of the target file is generated (step 556). The target digest is put in a cluster of the evolutionary tree that has digests that are most similar to the target digest, relative to digests of other clusters in the evolutionary tree (step 557). The centers and radiuses of clusters may be indexed to optimize searching the evolutionary tree for the most similar digests.

When the target digest is put in a cluster, the target digest may be deemed to inherit the properties of the other digests of the cluster. More particularly, a label of the cluster may be applied to the target digest (step 558). If the label of the cluster is malware, i.e., the digests of the cluster are malware, the target digest is also deemed to be malware (step 559 to step 560). In that case, the target digests is identified to be of the same malware family as the other digests of the cluster (step 560). A response action against the target digest is performed in response to detecting that the target digest is malware (step 561). Advantageously, knowing the identity of the malware facilitates selection of the most appropriate response action against the malware. For example, if the target digest is identified to be a member of a family of malware that encrypts a particular email client files, access to the email client files may be limited to certain authorized programs. As another example, if the target digest is identified to be a member of a family of malware that corrupts files in a certain way, files that have been corrupted may be restored using a known antidote to the malware.

Other actions may be performed when the label of the cluster is not malware (step 559 to step 562). For example, when the label of the cluster is goodware, i.e., the digests of the cluster are goodware, the target digest may also be presumed to be goodware when the target digest is signed by a reputable signer. When the cluster does not have a label or have mix goodware and malware digests, further analysis on the cluster may be performed to resolve the ambiguity. For example, the files of the digests of the cluster may be executed in a sandbox, evaluated by antivirus researchers etc., to verify their labels. In any case, having the mixed or unlabeled digests in the evolutionary tree provides hints as to the origin of the digests, and accordingly facilitates analysis.

Figure 11:
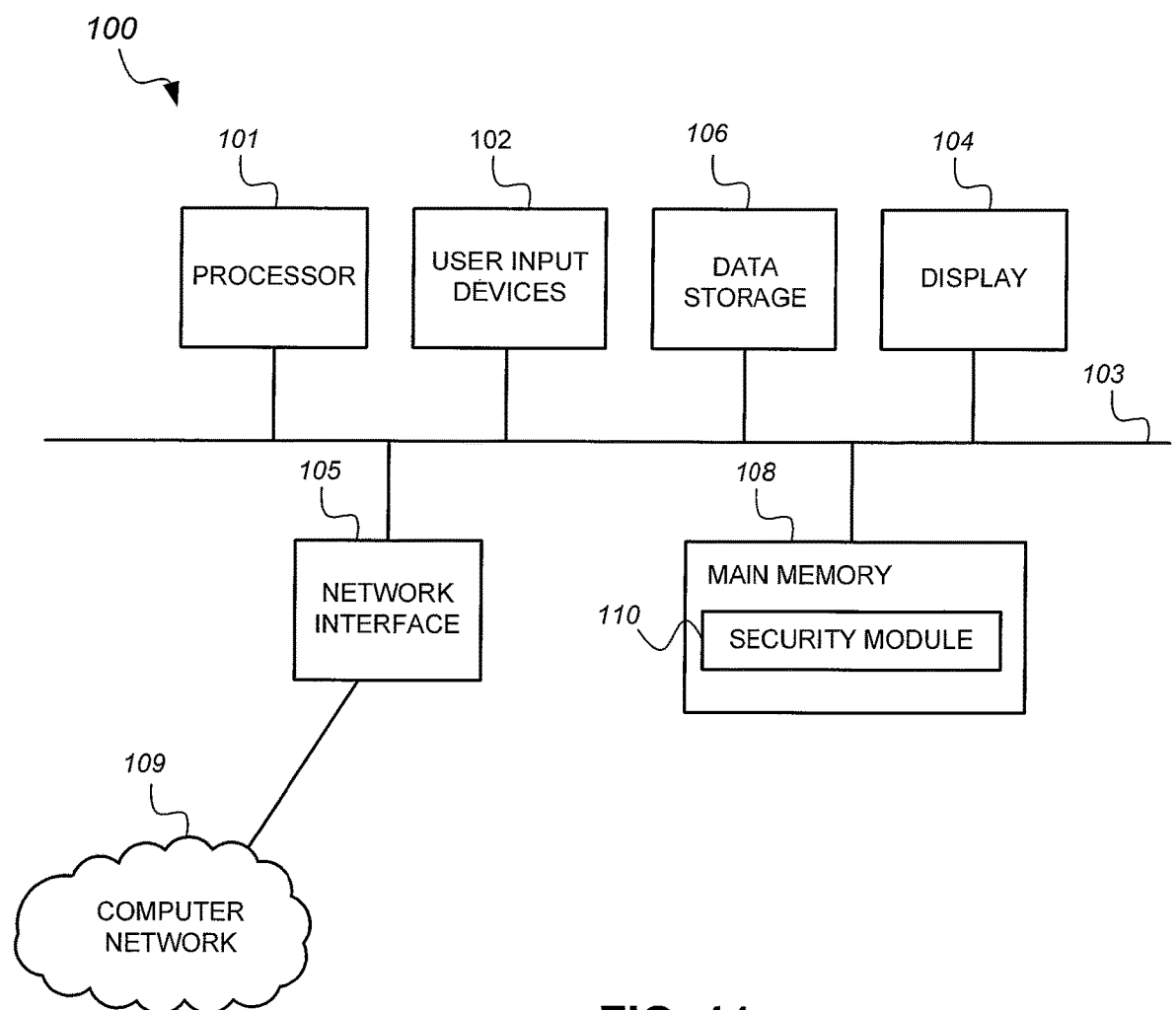
FIG. 11 shows a logical diagram of a computer system that may be employed with embodiments of the present invention.

Referring now to FIG. 11, there is shown a logical diagram of a computer system 100 that may be employed with embodiments of the present invention. The computer system 100 may be employed as a support server 170 or other computer described herein. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with a security module 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the security module 110.

The security module 110 may comprise instructions for generating a hierarchical evolutionary tree when the computer system 100 is configured as the support server 170. The security module 110 may comprise instructions for evaluating target files using the evolutionary tree when the computer system 100 is configured as the endpoint computer 181 or gateway 182. The security module 110 may comprise instructions for communicating with the support server 170 to evaluate target files when the computer system 100 is configured as an end user computer 183. In that case, the support server 170 may be configured to evaluate the target file using the evolutionary tree.

Systems and methods for detecting and identifying malware have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting malware using a hierarchical evolutionary tree, the method comprising:
    generating, using a locality sensitive hashing function, a plurality of digests of sample files, the sample files including samples of malware;
    grouping the plurality of digests into a plurality of clusters by performing a recursive clustering process that identifies a pair of digests of the plurality of digests that are not in a same cluster and are closest in terms of distance relative to other digests of the plurality of digests, puts the pair of digests in a same cluster when a distance between the pair of digests is not greater than a first distance threshold, and stops the recursive clustering process when the distance between the pair of digests is greater than the first distance threshold;
    grouping the plurality of clusters into a plurality of nodes;
    generating a hierarchical evolutionary tree by connecting the plurality of nodes in hierarchical order;
    receiving a target digest of a target file; and
    placing the target digest in a particular cluster in a particular node in the hierarchical evolutionary tree to determine whether the target file is malware.

2. The method of claim 1, wherein placing the target digest in the particular cluster in the particular node in the hierarchical evolutionary tree comprises:
    identifying the particular cluster as having digests that are most similar to the target digest relative to digests in other clusters in the hierarchical evolutionary tree.

3. The method of claim 1, further comprising:
    detecting that the target file is malware in response to the particular cluster being labeled as malware.

4. The method of claim 1, further comprising:
    detecting that the target file is malware of a particular malware family in response to other clusters in the particular node being labeled as malware of the particular malware family.

5. The method of claim 1, wherein the target digest is closest to a center of the particular cluster in terms of distance relative to centers of other clusters in the hierarchical evolutionary tree.

6. The method of claim 1, wherein the pair of digests is put in the same cluster when the distance between the pair of digests is not greater than the first distance threshold by putting a first digest of the pair of digests in a cluster that already includes a second digest of the pair of digests.

7. The method of claim 1, wherein the pair of digests is put in the same cluster when the distance between the pair of digests is not greater than the first distance threshold by merging a cluster that includes a first digest of the pair of digests with a cluster that includes a second digest of the pair of digests.

8. The method of claim 1, wherein generating the hierarchical evolutionary tree includes performing a recursive tree generation process that:
    identifies a first cluster and a second cluster of the plurality of clusters that are not in a same node and are closest in terms of distance relative to other clusters of the plurality of clusters;
    puts the first cluster and the second cluster in a same node when a distance between the first cluster and the second cluster is not greater than a second distance threshold; and
    stops the recursive tree generation process when the distance between the first cluster and the second cluster is greater than the second distance threshold.

9. The method of claim 8, wherein a center of the first cluster is closest to a center of the second cluster in terms of distance relative to centers of other clusters of the plurality of clusters.

10. The method of claim 8, wherein the first cluster and the second cluster are put in the same node when the distance between the first cluster and the second cluster is not greater than the second distance threshold by including the first cluster in a node that already includes the second cluster.

11. The method of claim 8, wherein the first cluster and the second cluster are put in the same node when the distance between the first cluster and the second cluster is not greater than the second distance threshold by merging a node that includes the first cluster with another node that includes the second cluster.

12. A computer system for generating a hierarchical evolutionary tree for detecting malware, the computer system comprising at least one processor and a memory, the memory storing instructions that when executed by the at least one processor cause the computer system to:
    generate, using a locality sensitive hashing function, a plurality of digests of sample files, the sample files including samples of malware;
    group the plurality of digests into a plurality of clusters by performing a recursive clustering process that identifies a pair of digests of the plurality of digests that are not in a same cluster and are closest in terms of distance relative to other digests of the plurality of digests, puts the pair of digests in a same cluster when a distance between the pair of digests is not greater than a first distance threshold, and stops the recursive clustering process when the distance between the pair of digests is greater than the first distance threshold;
    group the plurality of clusters into a plurality of nodes; and
    connect the plurality of nodes in a hierarchical order to form the hierarchical evolutionary tree.

13. The computer system of claim 12, wherein the instructions when executed by the at least one processor cause the computer system to group the plurality of clusters into the plurality of nodes by:

identifying a first cluster and a second cluster of the plurality of clusters that are not in a same node and are closest in terms of distance relative to other clusters of the plurality of clusters;

putting the first cluster and the second cluster in a same node when a distance between the first cluster and the second cluster is not greater than a second distance threshold; and stopping the recursive tree generation process when the distance between the first cluster and the second cluster is greater than the second distance threshold.

14. The computer system of claim 12, wherein the instructions when executed by the at least one processor cause the computer system to:

receive a target digest of a target file; and place the target digest in a particular cluster in a particular node in the hierarchical evolutionary tree to determine whether the target file is malware.

15. The computer system of claim 12, wherein the instructions when executed by the at least one processor cause the computer system to:

provide the hierarchical evolutionary tree to a central computer that screens network traffic for malware using the hierarchical evolutionary tree.

* * * * *